United States Patent
Kim et al.

(10) Patent No.: US 7,418,304 B2
(45) Date of Patent: Aug. 26, 2008

(54) APPARATUS AND METHOD FOR ADJUSTING OUTPUT LEVEL OF AUDIO DATA TO BE REPRODUCED

(75) Inventors: Yang Gi Kim, Seoul (KR); Jun Hyung Park, Anyang-si (KR)

(73) Assignee: LG Electronics Inc., Seoul (KR)

( * ) Notice: Subject to any disclaimer, the term of this patent is extended or adjusted under 35 U.S.C. 154(b) by 797 days.

(21) Appl. No.: 10/809,780

(22) Filed: Mar. 26, 2004

(65) Prior Publication Data

US 2005/0049735 A1    Mar. 3, 2005

(30) Foreign Application Priority Data

Aug. 25, 2003  (KR)  ............ 10-2003-0058847

(51) Int. Cl.
*G06F 17/00* (2006.01)
*H03G 3/00* (2006.01)
(52) U.S. Cl. ................................ 700/94; 381/107
(58) Field of Classification Search ............. 381/56, 381/104, 106, 107, 109; 700/94
See application file for complete search history.

(56) References Cited

U.S. PATENT DOCUMENTS 5,291,462 A   3/1994   Richards 5,901,119 A   5/1999   Inoue

FOREIGN PATENT DOCUMENTS

| CN | 1175062 | 3/1998 |
|---|---|---|
| EP | 1 079 535 | 2/2001 |
| EP | 1 107 254 | 6/2001 |
| KR | 10-2002-0015578 | 2/2002 |
| WO | WO 02-17146 | 2/2002 |
| WO | WO 02/41319 | 5/2002 |

OTHER PUBLICATIONS

Replay Gain standard. [Online] [Retrieved on Aug. 19, 2007]. Retrieved from URL:<http://www.replaygain.org>. Last updated on Oct. 10, 2001.*

(Continued)

*Primary Examiner*—Suhan Ni
*Assistant Examiner*—Walter F Briney, III
(74) *Attorney, Agent, or Firm*—Ked & Associates, LLP

(57) ABSTRACT

An apparatus and method for adjusting the output level of audio data to be reproduced can adjust any one of audio files of different types to a consistent or reference level prior to amplifying at a desired level (e.g., user selected volume). Therefore, digital audio systems and methods according to embodiments of the present invention can reproduce audio files of various types such as an MP3 audio type, MPEG2 audio type and AC3 audio type, and the output level of audio data to be reproduced of each of the audio files can be adjusted to a value corresponding to an audio volume level set by a user, which can prevent or reduce the output levels of the audio data from becoming different because of audio recording levels and recording formats of the audio files set in creation or recording processes thereof.

23 Claims, 9 Drawing Sheets

OTHER PUBLICATIONS

MP3Gain version 0.9.7 Final Beta. [Online] [Retrieved on Aug. 19, 2007]. Retrieved from URL:<http://web.archive.org/web/20021203004344/home.hccnet.nl/h.edskes/mirror.htm>. First available on Oct. 30, 2002. Six screenshots.*

Windows XP article retrieved from Wikipedia. [Online] [Retrieved on Aug. 19, 2007]. Retrieved from URL:<http://en.wikipedia.org/wiki/Windows_XP>.*

MP3Gain 0.9.7 Final Beta forum. [Online] [Retrieved Aug. 19, 2007]. Retrieved from URL:<http://www.hydrogenaudio.org/forums/lofiversion/index.php/t4132.html>.*

CD 11172-3, Coding of Moving Pictures and Associated Audio for Digital Storage Media at up to about 1.5 Mbit/s, Part 3 Audio (online) (retrieved on Mar. 2, 2008 from http://le-hacker.org/hacks/mpeg-drafts/11172-3.pdf) (archived by WayBack Machine on Jun. 6, 2003) (39 pages).*

M. Nilsson: "ID3 tag: ID3v2.4.0 documents: Main Structure and Native Frames" 'Online!, Nov. 2000, XP002302388.

Broadhead M. A. et al.: "Direct Manipulation of MPEG Compressed Digital Audio," Proceedings of ACM Multimedia '95 San Francisco, Nov. 1995, New York, Nov. 1995, XP000960419, pp. 499-507.

* cited by examiner

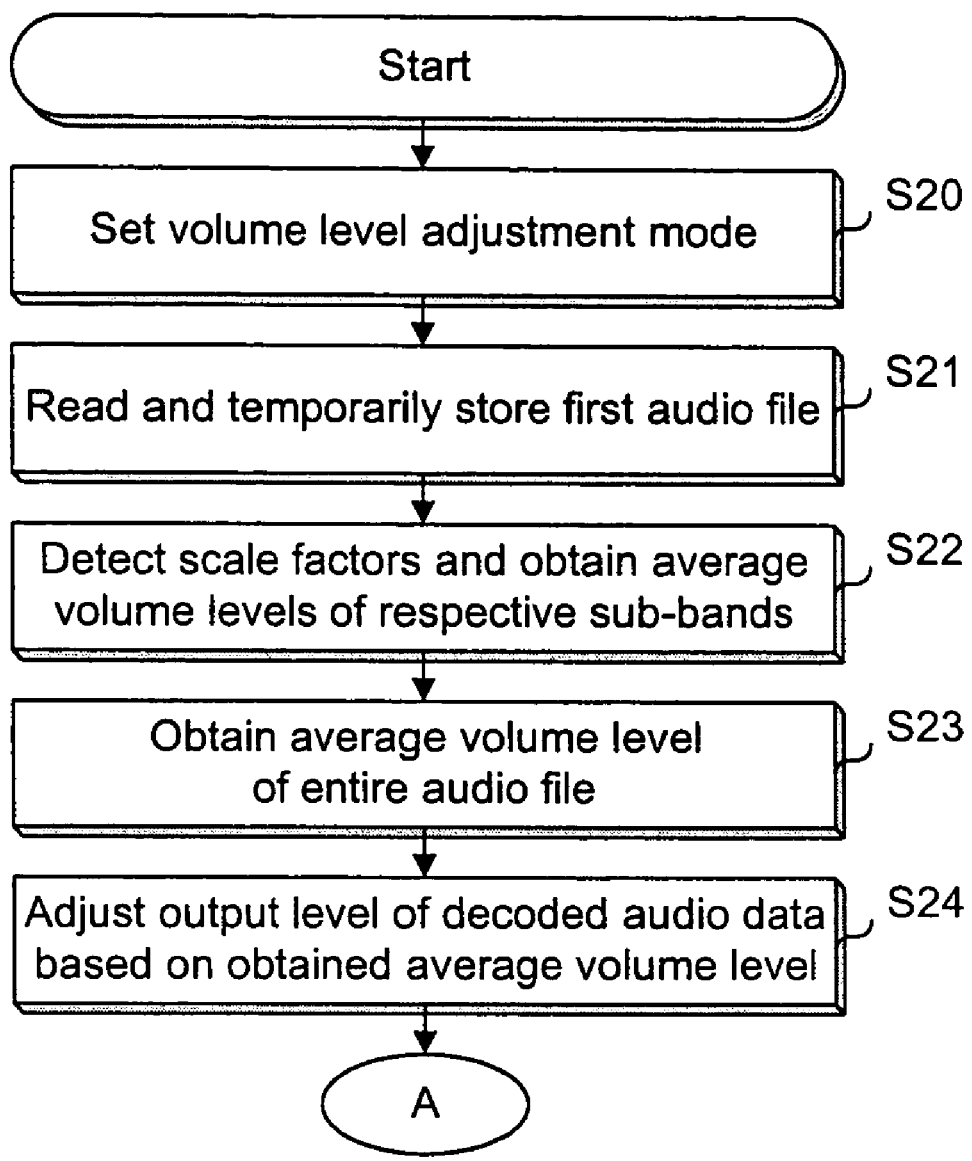

APPARATUS AND METHOD FOR ADJUSTING OUTPUT LEVEL OF AUDIO DATA TO BE REPRODUCED

BACKGROUND OF THE INVENTION

1. Field of the Invention

The present invention relates to an apparatus and method for adjusting the output level of audio data to be reproduced in a digital audio system.

2. Background of the Related Art

FIG. 1 is a block diagram showing the configuration of a related art digital audio system. Various digital audio systems, for example, a portable terminal such as an MP3 player, a portable computer, and a personal computer, each include an audio source 10, an audio codec 11, an audio controller 12 and an audio amplifier 13.

The audio source 10 is a recording medium for recording/storing audio files of various types such as an MP3 audio type, MPEG2 audio type and AC3 audio type, which may be, for example, an optical disc, hard disc or memory. The audio codec 11 decodes an audio file read from the audio source 10 into the original audio data to be reproduced and outputs the decoded audio data to the audio amplifier 13, or encodes external input audio data into an audio file so that the encoded audio file can be recorded in the audio source 10.

The audio controller 12 is adapted to control the encoding and decoding operations of the audio codec 11, and adjust the gain of the audio amplifier 13 based on an audio volume level set by a user. The audio amplifier 13 acts to amplify the audio data to be reproduced, outputted from the audio codec 11, at the adjusted gain and output the amplified audio data to a speaker.

Thus, the user of the related art digital audio system, configured and operated as described above, can download and store desired audio files of various types into the audio source 10, or encode external input audio data into an audio file of a predetermined specific format and record the encoded audio file in the audio source 10. Also, the user can play a desired one of the various types of audio files stored in the audio source 10, and listen to the played audio file at a desired audio output level by adjusting an audio volume key.

However, as described above, the related art digital audio system has various disadvantages. For example, the various types of audio files stored in the audio source 10 may not be uniform in their output levels because of their audio recording levels and recording formats set in their creation or recording processes. For at least this reason, the audio amplifier 13 may output audio data to be reproduced to the speaker at different output levels. In an example shown in FIG. 2, the user may sequentially play an MP3 audio file, MPEG2 audio file and AC3 audio file stored in the audio source 10 under the condition of adjusting the audio volume level to a value appropriate to the MP3 audio file. In this case, the output levels of the MPEG2 audio file and AC3 audio file played successively subsequently to the MP3 audio file may be different from that of the MP3 audio file because of their respective audio recording levels and recording formats set in the creation or recording processes. Accordingly, there occurs user inconvenience in having to adjust the audio volume level again.

The above references are incorporated by reference herein where appropriate for appropriate teachings of additional or alternative details, features and/or technical background.

SUMMARY OF THE INVENTION

An object of the invention is to solve at least the above problems and/or disadvantages and to provide at least the advantages described hereinafter.

Another object of the present invention is to provide an apparatus and method for adjusting the output level of audio data to be reproduced in a digital audio system.

Another object of the present invention is to provide an apparatus and method for adjusting the output level of audio data to be reproduced in a digital audio system that is capable of consistently reproducing audio files of various types.

Another object of the present invention is to provide an apparatus and method for adjusting the output level of audio data to be reproduced in a digital audio system that is capable of directly adjusting recording differences when reproducing audio files of various types such as an MP3 audio type, MPEG2 audio type and AC3 audio type.

Another object of the present invention is to provide an apparatus and method for adjusting the output level of audio data to be reproduced in a digital audio system that is capable of consistently reproducing audio files of various types such as an MP3 audio type, MPEG2 audio type and AC3 audio type after the output level of audio data to be reproduced of each of the audio files is adjusted to a value corresponding to an audio volume level set by a user.

In accordance with an aspect of the present invention, the above and other objects can be accomplished in a whole or in part by providing a method for adjusting an output level of audio data to be reproduced that includes searching a recording medium for an audio file requested to be played, the recording medium storing a plurality of audio files, temporarily storing audio data to be reproduced of the searched audio file and detecting an output level of the temporarily stored audio data and adjusting a gain of an audio output amplifier on the basis of the detected output level to output the adjusted audio data to be reproduced.

In accordance with another aspect of the present invention, the above and other objects and advantages can further be accomplished in a whole or in part by providing an article including a machine-readable storage medium containing instructions for adjusting an output level of audio data to be reproduced, the instructions, when executed in a digital audio system, causing the system to search a recording medium for a audio file requested to be played, the recording medium storing audio files of various types, temporarily store audio data to be reproduced of the searched audio file and detect an output level of the temporarily stored audio data and adjust a gain of an audio output amplifier on the basis of the detected output level to output the audio data to be reproduced at a prescribed level.

In accordance with another aspect of the present invention, the above and other objects and advantages can further be accomplished in a whole or in part by providing a digital audio system that includes read unit for reading an audio file requested to be played from a recording medium, the recording medium storing audio files of various types, conversion unit for converting the read audio file into audio data to be reproduced, storage unit for temporarily storing the audio data to be reproduced, detection unit for detecting an output level of the temporarily stored audio data, audio amplifier unit for amplifying and outputting the audio data to be reproduced and control unit for controlling the read unit to search the recording medium for the audio file requested to be played and read the searched audio file from the recording medium, coupled to the storage unit and detection unit, and for adjusting a gain of the audio amplifier unit on the basis of the detected output level.

In accordance with yet another aspect of the present invention, the above and other objects and advantages can further be accomplished in a whole or in part by providing an apparatus for adjusting an output level of audio data to be reproduced that includes a converter configured to receive a plurality of audio files and to convert a received audio file into audio data to be reproduced, a detector configured to detect an output level of the audio data to be reproduced and a controller coupled to the converter and the detector and configured to adjust a gain of the audio data to be reproduced on the basis of the detected output level.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements wherein:

FIGS. 7a and 7b are flow charts illustrating a procedure of adjusting the output level of an MP3 audio file to a value corresponding to an appropriate audio volume level desired by a user according to the present invention.

DETAILED DESCRIPTION OF PREFERRED EMBODIMENTS

Embodiments of an apparatus and method for adjusting the output level of audio data to be reproduced according to the present invention can be applied to various digital audio systems, for example, a portable terminal such as an MP3 player, and a portable computer or personal computer having an audio file playback function and the like.

Figure 1:
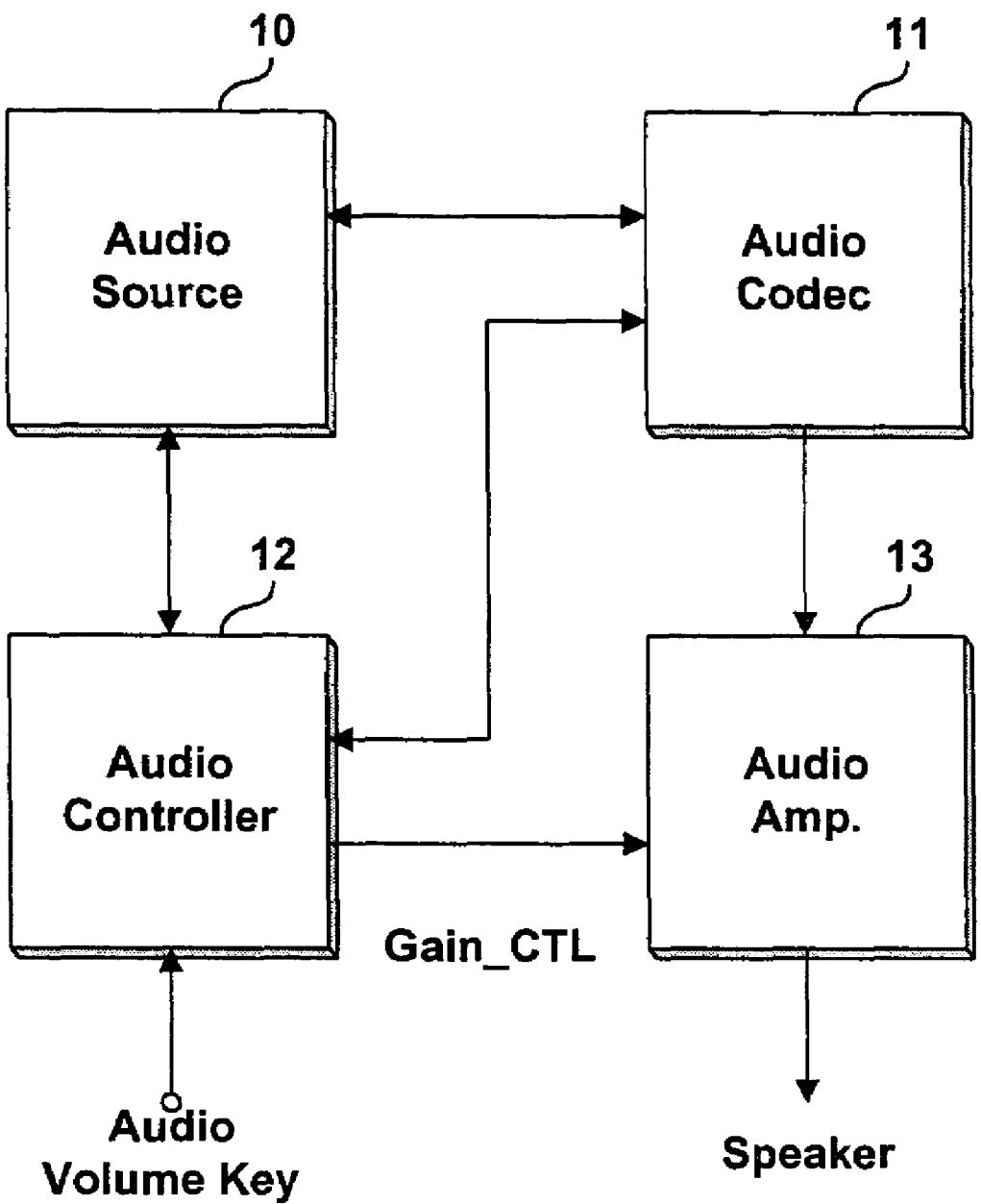
FIG. 1 is a block diagram showing the configuration of a related art digital audio system.
Figure 2:
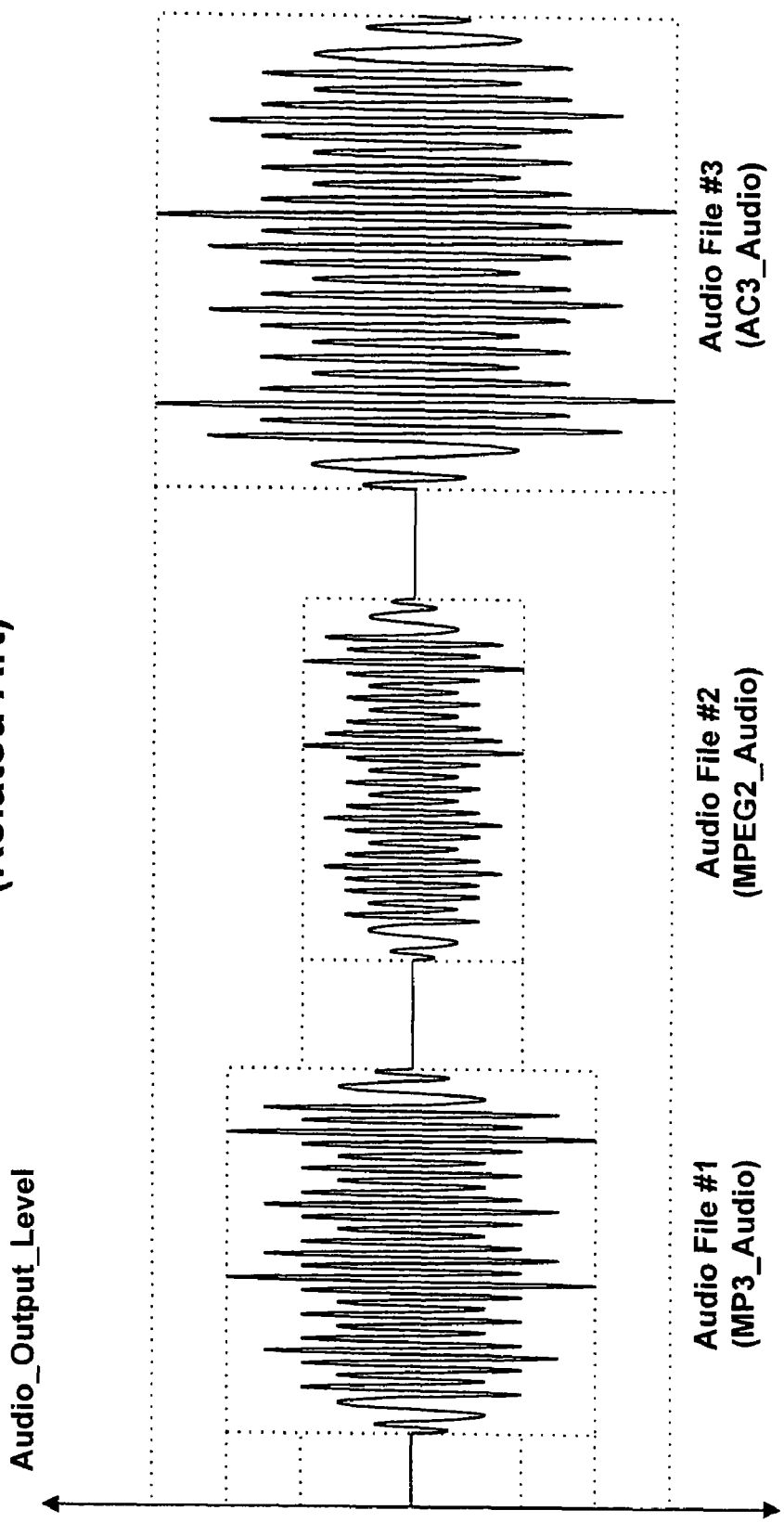
FIG. 2 is a waveform diagram showing the output levels of audio data of audio files of different types reproduced in the related art digital audio system.
Figure 3:
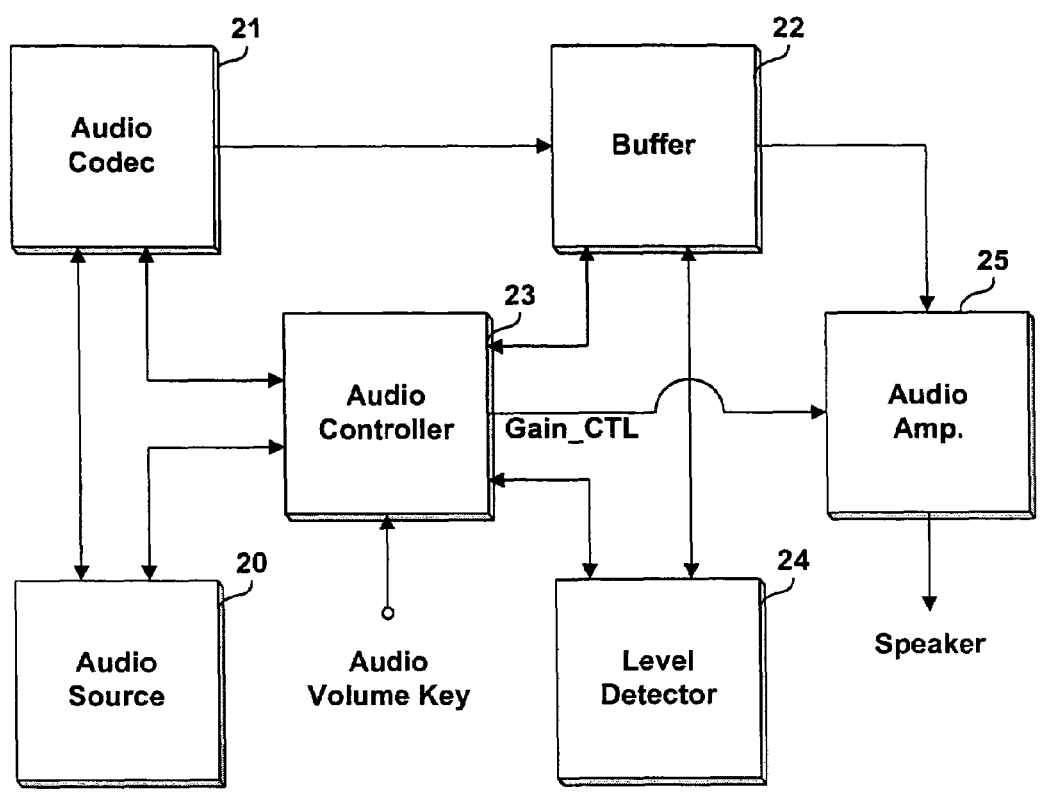
FIG. 3 is a block diagram showing a preferred embodiment of a digital audio system according to the present invention.

FIG. 3 is a block diagram illustrating an embodiment of a digital audio system according to the present invention. As shown in FIG. 3, the digital audio system can include an audio source 20, an audio codec 21, a buffer 22, an audio controller 23, a level detector 24 and an audio amplifier 25.

As described above, the audio source 20 can be a recording medium for recording/storing audio files of various types such as an MP3 audio type, MPEG2 audio type and AC3 audio type. The audio source 20 may be, for example, an optical disc, hard disc or memory. The audio codec 21 can decode an audio file read from the audio source 20 into the original audio data to be reproduced and output the decoded audio data to the audio amplifier 25, or encode external input audio data into an audio file so that the encoded audio file can be recorded in the audio source 20.

The audio controller 23 can control the encoding and decoding operations of the audio codec 21, and adjust the gain of the audio amplifier 25 based on an audio volume level set by a user. The audio amplifier 25 can operate to amplify the audio data to be reproduced, which can be outputted from the audio codec 21, at the adjusted gain and output the amplified audio data, for example to a speaker.

Preferably, when any one audio file is read from the audio source 20 and decoded into the original audio data to be reproduced by the audio codec 21, the decoded audio data to be reproduced is temporarily stored in the buffer 22 before being amplified and outputted by the audio amplifier 25. The level detector 24 can detect a level such as the peak level or average level of the audio data to be reproduced (e.g., temporarily stored in the buffer 22).

The audio controller 23 can adjust (e.g., increase or reduce) the gain of the audio amplifier 25 with reference to the level of the audio data to be reproduced preferably detected by the level detector 24. Therefore, the output level of audio data to be reproduced of each audio file can be directly or automatically adjusted to a value corresponding to the audio volume level set by the user. However, the present invention is not intended to be so limited. For example, the level of the audio data output from the audio source 20 for reproduction, could be adjusted to a reference level before transmission to the audio amplifier 25 based on the corresponding level detected by the level detector 24.

Figure 4:
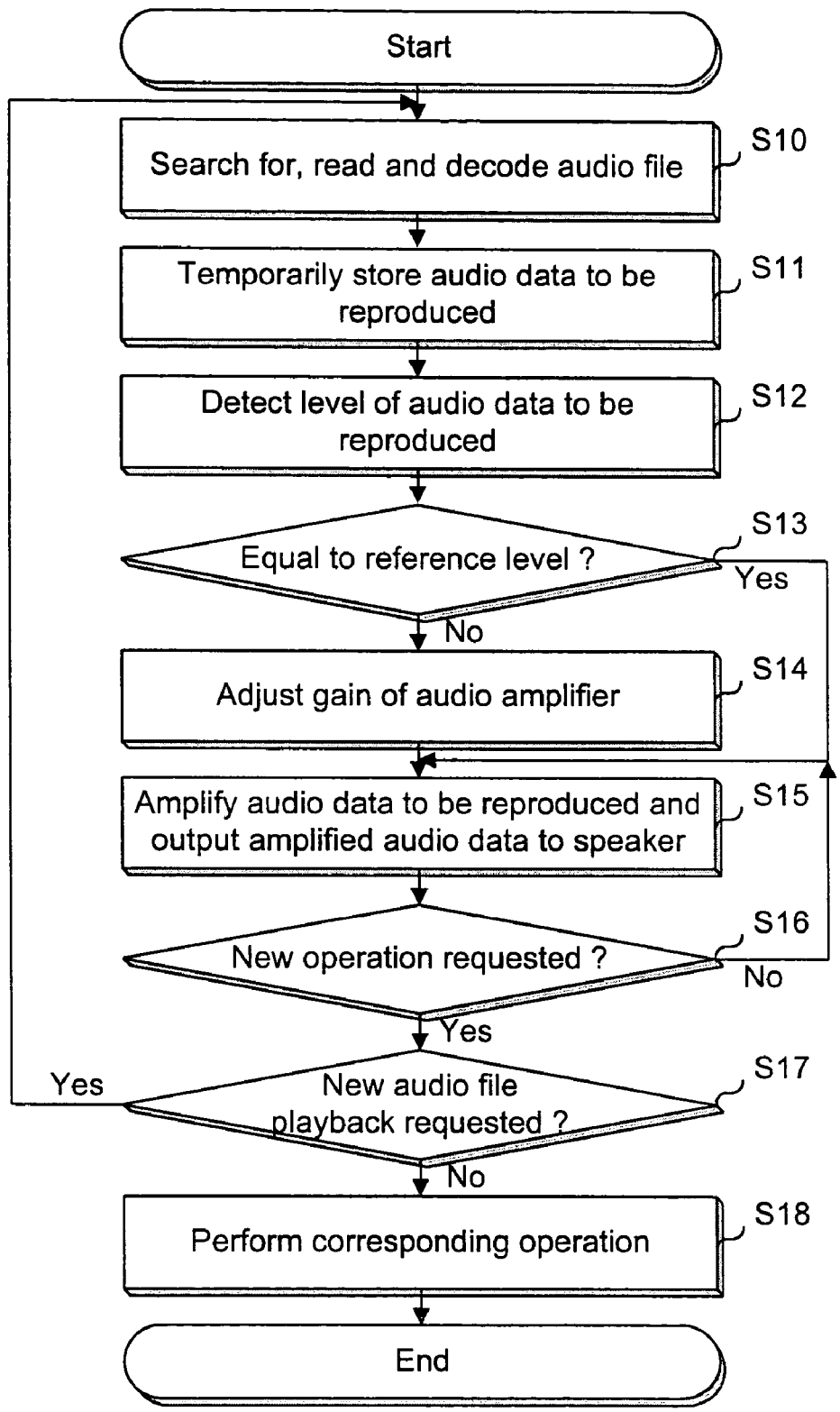
FIG. 4 is a flow chart illustrating a preferred embodiment of a method for adjusting the output level of audio data to be reproduced according to the present invention.

FIG. 4 is a flow chart illustrating an embodiment of a method for adjusting the output level of audio data to be reproduced in a digital audio system according to the present invention. The method shown in FIG. 4 can be applied to and will be described using the digital audio system of FIG. 3. However, the present invention is not intended to be so limited.

As shown in FIG. 4, after a process starts the audio controller 23 can search a plurality of audio files stored in the audio source 20 for an audio file whose playback is selected (e.g., requested by a user). The audio controller 23 can read the searched audio file from the audio source 20, and control the audio codec 21 to decode the read audio file into the original audio data to be reproduced (block S10).

Under the control of the audio controller 23, the decoded audio data to be reproduced is not immediately amplified and outputted by the audio amplifier 25, but can be temporarily stored in the buffer 22 (block S11). For example, the buffer 22 can temporarily store audio data to be reproduced of an amount corresponding to a predetermined period of time (for example, about 2 minutes), a predetermined size or a partial or complete capacity thereof.

Figure 5:
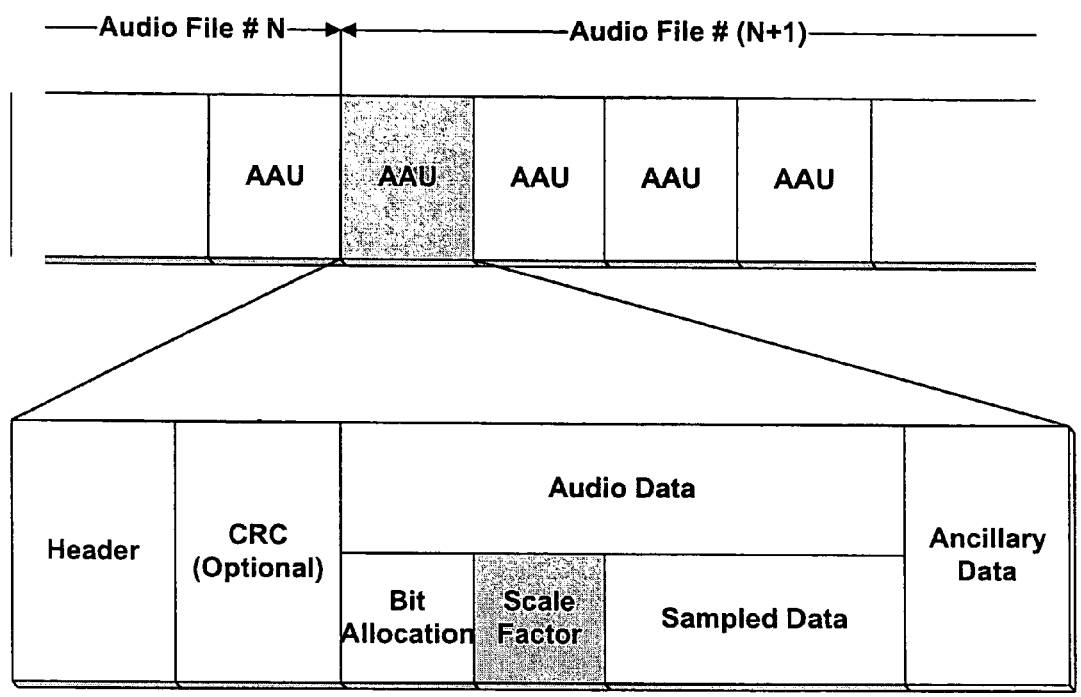
FIG. 5 is a diagram showing the data format of an exemplary audio frame of an audio file.

For example, in the case where the audio file requested to be played is an MP3 audio file, the buffer 22 can temporarily store audio data to be reproduced, e.g., on an audio access unit (AAU) basis, namely, of a predetermined number of AAUs. As shown in FIG. 5, the MP3 audio file is composed of a plurality of AAUs, each constituting one frame. Each of the AAUs is an independently decodable base or minimum unit and is also referred to as an audio frame. The AAUs can each include a field for recording header information, a field for optionally recording cyclic redundancy checking (CRC) information, and a field for recording real-time audio data, as shown in FIG. 5. Separately recorded in the real-time audio data field can be bit allocation information, scale factor information and sampled audio data.

For the MP3 audio file, an audio signal can be encoded while being decomposed into 32 sub-bands. A scale factor can represent the signal level of one sub-band. At this time, information about the signal level of each sub-band can be encoded together. As a result, when the encoded and recorded audio data is decoded into the original one, the scale factor can act as volume level information for each sub-band used to restore the volume of the audio data to the original one.

The level detector 24 can detect the level of the audio data to be reproduced, (e.g., temporarily stored in the buffer 22) under the control of the audio controller 23 (block S12). For example, the level detector 24 can sample the audio data to be reproduced, temporarily stored in the buffer 22, at a predetermined period, obtain the peak level of the audio data from the sampled values and output the obtained peak level to the audio controller 23. Alternatively, the level detector 24 can obtain the average level of the audio data from the sampled values and output the obtained average level to the audio controller 23. However, the present invention is not intended to be so limited as other methods of determining the level of the audio data can be used.

In the case where the audio file requested to be played is an MP3 audio file, the average level of the audio data to be reproduced can be obtained on the basis of scale factors in AAUs of the MP3 audio file. In this case, the average level of the audio data to be reproduced can be obtained at the same time that the MP3 audio file requested to be played is decoded and stored. The level detector 24 is capable of accumulatively adding scale factor information contained in AAUs of which the decoded audio data is stored in the buffer 22, among AAUs of the read MP3 audio file, to obtain the average volume levels of respective sub-bands, and summing up the obtained average volume levels of the respective sub-bands to obtain the average volume level of the entire audio file.

The audio controller 23 can recognize the peak level, average level or the like of the audio data to be reproduced, outputted from the level detector 24 as exemplarily described above. The audio controller 23 can compare the recognized level of the audio data to be reproduced with a predetermined reference level, which for example may be experimentally obtained in the process of manufacturing the digital audio system.

If the peak level or average level of the audio data to be reproduced is determined not to be equal to the predetermined reference level as a result of the comparison (block S13), the audio controller 23 preferably adjusts the gain of the audio amplifier 25 so that the audio amplifier 25 can amplify and output the audio data to be reproduced, at the adjusted gain (e.g., user set gain).

For example, the audio controller 23 can reduces the gain of the audio amplifier 25 if the audio data level detected by the level detector 24 is higher than the reference level, and increase it if the detected audio data level is lower than the reference level (block S14). In the case where the audio data level detected by the level detector 24 is equal to the reference level, the audio controller 23 can maintain the gain of the audio amplifier 25 corresponding to the audio volume level set by the user as it is.

If the above-described operations of adjusting the gain of the audio amplifier 25 are completed, then the audio amplifier 25 can amplify the audio data to be reproduced (e.g., audio volume set by a user) and preferably output the amplified audio data to the speaker under the condition that the above-described audio data level detection operations and audio amplifier gain adjustment operations are stopped (block S15). Alternatively, such audio data level detection operations and audio amplifier gain adjustment operations can be repeatedly, periodically or continually performed during playback or audio data reproduction.

Thereafter, the audio file playback operation is preferably continued until the user requests a new operation through an operator action such as a key input or the like (block S16). In the case where the user requests playback of a new audio file (block S17), the audio controller 23 can search a plurality of audio files stored in the audio source 20 for the audio file whose playback is requested by the user, read the searched audio file from the audio source 20, and control the audio codec 21 again to decode the read audio file into the original audio data to be reproduced. The audio controller 23 can then control the buffer 22, the level detector 24 and the audio amplifier 25 again to perform audio data level detection operations and audio amplifier gain adjustment operations before the decoded audio data to be reproduced is amplified and outputted by the audio amplifier 25. If a different new operation is requested by the user, a corresponding operation can be performed (block S18).

Figure 6:
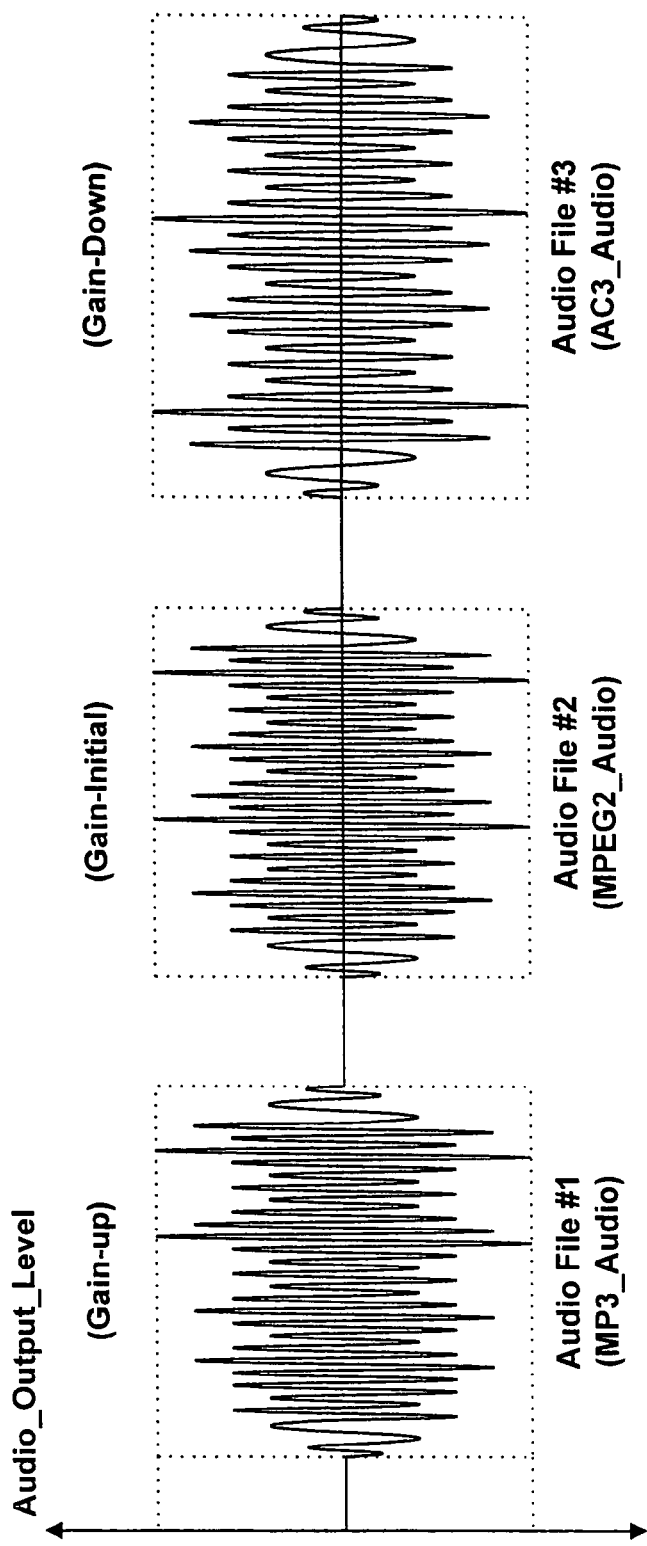
FIG. 6 is a waveform diagram showing the output levels of audio data of audio files of different types reproduced in a digital audio system to which embodiments of the present invention are applied.

According to embodiments of the present invention, the output level of the audio data amplified and outputted through the audio amplifier 25 can be stably maintained at a desired value. For example, as shown in FIG. 6, in the case where the user sequentially plays an MP3 audio file, MPEG2 audio file and AC3 audio file stored in the audio source 10, the output level of audio data to be reproduced of each of the audio files is directly or automatically adjusted to a desired value corresponding to the audio volume level set by the user even though the audio files have different audio recording levels and different recording formats.

Figure 7B:
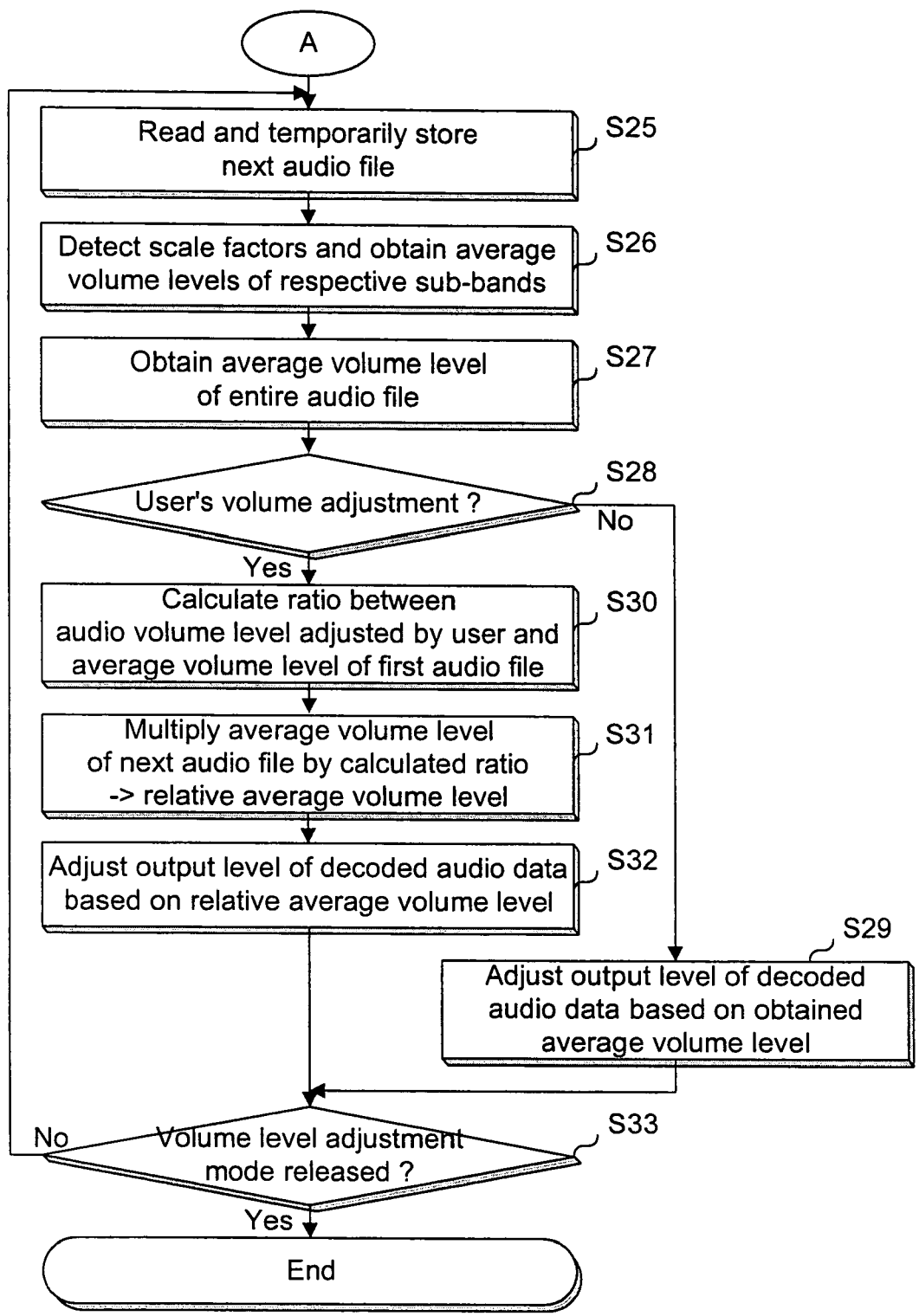

FIG. 7(a) and 7(b) are flow charts illustrating an embodiment of another method for adjusting the output level of audio data to be reproduced in a digital audio system according to the present invention. The method shown in FIG. 7(a) and 7(b) can be applied to and will be described using the digital audio system of FIG. 3. However, the present invention is not intended to be so limited.

As shown in FIGS. 7(a) and 7(b), an average volume level of audio data to be reproduced can be obtained and used to adjust the output level of the audio data to be reproduced to a value corresponding to an appropriate audio volume level desired by the user. After a process starts, if a volume level adjustment mode for an audio file is set in response to the user's request (block S20), the audio controller 23 can read and temporarily store a first audio file requested to be played, under the condition that audio data to be reproduced of the first audio file is not outputted (block S21). Subsequently, the audio controller 23 can detect scale factors or the like recorded respectively in audio frames (AAUs) of the temporarily stored first audio file (e.g., MP3 audio file) and accumulatively add the detected scale factors to obtain the average volume levels of respective sub-bands (block S22). The audio controller 23 can also sum up the obtained average volume levels of the respective sub-bands to obtain the average volume level of the entire first audio file (block S23). Preferably, the average volume levels of the sub-bands are obtained by accumulatively adding only sampled ones of the scale factors (e.g., not all of the scale factors) so that the output delay can be reduced to a predetermined degree.

Thereafter, the audio controller 23 can control the audio codec 21 to decode the read audio file into audio data to be reproduced, and then adjust the output level of the decoded audio data through a comparison between the obtained average volume level of the audio file and a predetermined reference level (block S24). The audio controller 23 can read and temporarily store a second audio file requested to be played, under the condition that the playback of the first audio file is not finished (block S25).

Subsequently, the audio controller 23 can detect scale factors recorded respectively in audio frames (AAUs) of the temporarily stored second audio file and accumulatively add the detected scale factors to obtain the average volume levels of respective sub-bands (block S26). The audio controller 23 can also sum up the obtained average volume levels of the respective sub-bands to obtain the average volume level of the entire second audio file (block S27).

At this time, the audio controller 23 preferably determines whether the user has adjusted an audio volume while the first audio file is being played (block S28). In the case where the audio volume is not adjusted, the audio controller 23 can control the audio codec 21 to decode the read second audio file into audio data to be reproduced, and then adjust the output level of the decoded audio data through a comparison between the obtained average volume level of the audio file and the predetermined reference level (block S29).

On the other hand, in the case where the audio volume is determined to have been adjusted, the audio controller 23 can calculate a ratio between an audio volume level adjusted by the user and the average volume level of the first audio file (block S30), and can multiply the average volume level of the second audio file by the calculated ratio to obtain a relative average volume level corresponding to the audio volume level desired by the user (block S31). The audio controller 23 preferably controls the audio codec 21 to decode the read audio file into audio data to be reproduced, and then adjusts the output level of the decoded audio data on the basis of the obtained relative average volume level (block S32).

In other words, beginning with the second audio file (and additional audio files), the audio controller 23 can repeat the operation of adjusting the output level of audio data to be reproduced, on the basis of the relative average volume level reflecting the audio volume level arbitrarily adjusted (e.g., subsequently) by the user. The audio controller 23 can end operations if the volume level adjustment mode is released (block S33).

As shown in FIGS. 7(a) and 7(b), the output level of audio data to be reproduced of an audio file requested to be played can be adjusted to a value corresponding to an appropriate audio volume level desired by the user. The appropriate volume level preferably corrects for an initially recorded level of the audio file and a user adjusted level of the audio reproduction.

Alternatively, the average volume level of an audio file obtained through the above-described procedure may be previously obtained and recorded as additional information in the audio file, for example, during the playback operation or recording operation. Such additional information can be read and used in the volume level adjustment mode set in response to the user's request. Using the recorded additional information can allow more rapid adjustment of the output level of audio data to be reproduced.

For example, first, the average volume level of an audio file obtained during the playback operation or recording operation can be recorded as additional information in the tail or prescribed position of any one of a plurality of AAUs constituting the audio file as shown in FIG. 5 such as the tail of the first AAU in which a relatively small amount of audio data is actually recorded. Then, if the volume level adjustment mode is set in response to the user's request, the first AAU of the audio file is searched so that the average volume level of the audio file recorded as the additional information in the tail thereof can be read and used. Accordingly, the output level of audio data to be reproduced can be adjusted more rapidly.

Figure 8:
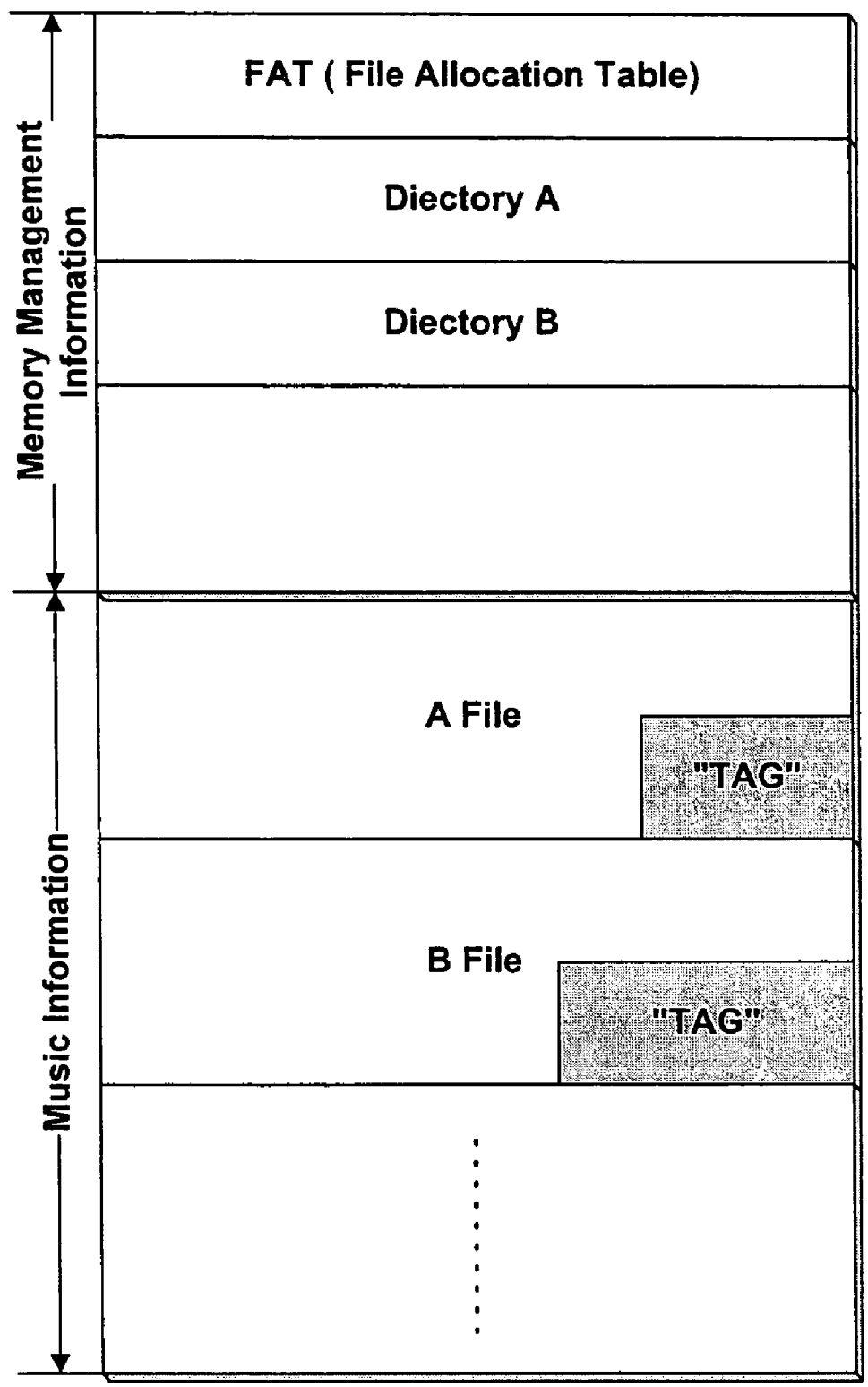
FIG. 8 is a diagram showing an exemplary recording area in which the average volume level of an MP3 audio file is recorded as additional information according to the present invention.

Alternatively, as shown in FIG. 8, the average volume level of each audio file obtained during the playback operation or recording operation may be recorded as additional information in the tail of each audio file. In this case, if the volume level adjustment mode is set in response to the user's request, the average volume level of the corresponding audio file recorded as the additional information in the tail thereof can be read and used. Accordingly, the output level of audio data to be reproduced can be adjusted more rapidly. Preferably, the average volume level as the additional information is recorded in an end portion of a string that is a tag of the corresponding audio file typically recorded with other additional information, for example, a singer's name, play time, etc.

Thus, operations of accumulatively adding scale factors recorded in an audio file to obtain the average volume level of the audio file as described above with reference to FIGS. 7a and 7b can be omitted (e.g., blocks S21-S23). Instead, the average volume level of the audio file additionally recorded as additional information in the tail of the first AAU of the audio file or a tag of the audio file can be read and used.

Alternatively, the average volume level of an audio file may be previously measured and separately stored in a memory of the digital audio system during a recording operation or while the playback operation is not performed. In this case, the playback operation can be performed with reference to the stored average volume level of the audio file so that the output level of audio data to be reproduced can be more rapidly adjusted.

Alternatively, the average volume level of an audio file may not be obtained directly in the digital audio system, but can be previously measured as in an above described embodiment and inserted into the format of the audio file during creation of the audio file and then provided during audio reproduction to the digital audio system Various software or firmware layers based upon a module or routine format containing application programs, operating system modules, device drivers, BIOS modules and interrupt handlers can be stored in at least one storage medium provided in the digital audio system. The applicable storage media include hard disc drives, compact discs (CDs) or digital versatile discs (DVDs), floppy discs, nonvolatile memories and system memories. The modules, routines or other layers stored in the storage medium contain instructions for allowing the convertible computer system to execute programmed acts when executed.

The software or firmware layers can be loaded on the system by one of various methods. For example, code segments are stored in floppy discs, CD or DVD discs or hard discs, or code segments transported through a network interface card, modem or other interface devices can be loaded on the system and can be executed by a corresponding software or firmware layer. In the loading or transporting process, the code segments and data signals carried by a carrier (through a telephone line, a network line, a radio link, a cable, etc.) can be sent to the system.

As described above, embodiments of apparatus and methods for adjusting the output level of audio data to be reproduced in a digital audio system according to the present invention have various advantages. For example, embodiments of apparatus and method for adjusting the output level of audio data to be reproduced in a digital audio system can directly or automatically adjust output levels of audio data to be reproduced of audio files of various types, which can have different recorded audio levels, to a value corresponding to an audio volume level set by a user. Further, embodiments can reduce the likelihood or prevent the output levels of the audio data from becoming different because of audio recording levels and recording formats of the audio files set in creation or recording processes thereof. Such different audio recording levels and recording formats can be adjusted before, after or in combination with adjusting for a user selected volume level.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structures described herein as performing the recited function and not only structural equivalents but also equivalent structures.

What is claimed is:

1. A method for adjusting an output level of audio data to be reproduced, comprising:
    searching a recording medium for an audio file requested to be played, said recording medium storing a plurality of audio files;
    temporarily storing audio data to be reproduced of the searched audio file and detecting an output level of the temporarily stored audio data; and
    adjusting a gain of an audio output amplifier on the basis of the detected output level to output said adjusted audio data to be reproduced, wherein the temporarily stored audio data includes scale factors of sub-bands of audio frames of the audio file, the scale factors used to obtain the output level of the temporarily stored audio data as an indication of an average volume of the audio file, the gain of the audio amplifier adjusted to cause the average volume to correspond to a volume level set by a user.

2. The method of claim 1, wherein the recording medium is adapted to store audio files of various types.

3. The method of claim 2, wherein the audio data to be reproduced is data into which the searched audio file is converted by an audio codec corresponding thereto, and wherein the recording medium is adapted to store at least one of an MP3 audio file, MPEG2 audio file and AC3 audio file.

4. The method of claim 1, wherein the detected output level is a peak level or average level of the temporarily stored audio data.

5. The method of claim 4, wherein said detected output level is determined by sampling a reduced subset of the temporarily stored audio data.

6. The method of claim 1, wherein the temporarily storing comprises:
    reading the searched audio file from the recording medium and converting it into the audio data to be reproduced;
    temporarily storing audio data of an amount corresponding to a predetermined period of time or a predetermined capacity, among the converted audio data, under the condition that the converted audio data is not amplified and outputted; and
    detecting the output level of the temporarily stored audio data.

7. The method of claim 6, wherein the adjusting comprises:
    comparing the detected output level with a predetermined reference level;
    increasing the gain of the audio output amplifier when the detected output level is determined to be lower than the reference level as a result of the comparison and reducing the gain when the detected output level is determined to be higher than the reference level; and
    amplifying the audio data to be reproduced, at the adjusted gain, to output the adjusted audio data at the reference level, wherein the predetermined reference level corresponds to the volume level set by the user.

8. The method of claim 1, wherein the adjusting comprises:
    comparing the detected output level with a predetermined reference level;
    increasing the gain of said audio output amplifier when the detected output level is determined to be lower than the reference level as a result of the comparison and reducing the gain when the detected output level is determined to be higher than the reference level; and
    amplifying the audio data to be reproduced, at the adjusted gain, to output the adjusted audio data at the reference level, wherein the predetermined reference level corresponds to the volume level set by the user.

9. The method of claim 1, wherein the detecting and adjusting are performed on an audio file basis.

10. The method of claim 1, wherein the output level is detected based on a peak level or average level obtained for said temporarily stored audio data, the peak level or average level obtained by accumulatively adding only sampled ones of the scale factors corresponding to respective ones of the sub-bands.

11. A machine-readable storage medium containing instructions for adjusting an output level of audio data to be reproduced, said instructions, when executed in a digital audio system, causing the system to:
    search a recording medium for an audio file requested to be played, the recording medium storing audio files of various types;
    temporarily store audio data to be reproduced of the searched audio file and detect an output level of the temporarily stored audio data; and
    adjust a gain of an audio output amplifier on the basis of the detected output level to output the audio data to be reproduced at a prescribed level, wherein the temporarily stored audio data includes scale factors of sub-bands of audio frames of the audio file, the scale factors used to obtain the output level of the temporarily stored audio data as an indication of an average volume of the audio file, the gain of the audio amplifier adjusted to cause the average volume to correspond to a volume level set by a user.

12. The article of claim 11, wherein the recording medium is adapted to store at least one of an MP3 audio file, MPEG2 audio file and AC3 audio file, and wherein the audio data to be reproduced is data into which the searched audio file is converted by an audio codec corresponding thereto.

13. The article of claim 11, wherein the detected output level is a peak level or average level of the temporarily stored audio data.

14. The article of claim 13, wherein the peak level or the average level is determined by sampling a reduced subset of the temporarily stored audio data.

15. The article of claim 11, wherein the storage medium contains instructions for causing the system to:
    read the searched audio file from the recording medium and convert it into the audio data to be reproduced;
    temporarily store audio data of an amount corresponding to a predetermined period of time or a predetermined capacity, among the converted audio data, under the condition that the converted audio data is not amplified and outputted; and detect the output level of the temporarily stored audio data.

16. The article of claim 11, wherein the storage medium contains instructions for causing the system to:
compare the detected output level with a predetermined reference level;
increase the gain of the audio output amplifier when the detected output level is determined to be lower than the reference level as a result of the comparison and reduce the gain when the detected output level is determined to be higher than the reference level;
first amplify the audio data to be reproduced, at the adjusted gain, to output it at the reference level; and
second amplify the first amplified audio data to be reproduced according to a user selected output level of the audio file to be played, wherein the predetermined reference level corresponds to the volume level set by the user.

17. The article of claim 11, wherein the output level is detected based on a peak level or average level obtained for said temporarily stored audio data, the peak level or average level obtained by accumulatively adding only sampled ones of the scale factors corresponding to respective ones of the sub-bands.

18. A digital audio system, comprising:
a reading device configured to read an audio file requested to be played from a recording medium, the recording medium storing audio files of various types;
a converter configured to convert the read audio file into audio data to be reproduced;
a storage device configured to temporarily store the audio data to be reproduced;
a detector configured to detect an output level of the temporarily stored audio data;
an audio amplifier configured to amplify and output the audio data to be reproduced; and
a controller configured to control the reading device to search the recording medium for the audio file requested to be played and read the searched audio file from said recording medium, coupled to said storage device and detector, and for adjusting a gain of the audio amplifier on the basis of the detected output level,
wherein the temporarily stored audio data includes scale factors of sub-bands of audio frames of the audio file, the scale factors used to obtain the output level, and
wherein the detector is adapted to detect a peak level or average level of said temporarily stored audio data, wherein the peak level or average level of the sub-bands, which are used to determine the peak level or the average level of the audio file, is obtained by accumulatively adding only sampled ones of the scale factors.

19. The system of claim 18, wherein the digital audio system is one of a portable terminal, a portable computer, and a personal computer having a playback function for the audio files, wherein the recording medium is adapted to store at least one of an MP3 audio file, MPEG2 audio file and AC3 audio file.

20. The system of claim 18, wherein the storage device is adapted to temporarily store audio data of an amount corresponding to a predetermined period of time or a predetermined capacity, among the converted audio data, under the condition that the converted audio data is not amplified and outputted by the audio amplifier.

21. The system of claim 18, wherein the detector is adapted to detect the output level of the temporarily stored audio data by sampling a reduced subset of the temporarily stored audio data.

22. The system of claim 18, wherein the controller is adapted to increase the gain of the audio amplifier means when the detected output level is lower than a predetermined reference level and reduce the gain when the detected output level is higher than the reference level to output the audio data to be reproduced, at the reference level.

23. The system of claim 18, wherein the controller is adapted to, on an audio file basis, control the storage device to temporarily store the audio data to be reproduced, control the detector to detect the output level of the temporarily stored audio data, and adjust the gain of the audio amplifier responsive to detected output level and a selected output level of the audio file requested to be played.

* * * * *